(12) United States Patent
Chen et al.

(10) Patent No.: US 8,804,335 B2
(45) Date of Patent: Aug. 12, 2014

(54) ELECTRONIC DEVICE ENCLOSURE

(75) Inventors: Yun-Lung Chen, New Taipei (TW); Chung Chai, New Taipei (TW); Wei-Yong Ma, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/404,074

(22) Filed: Feb. 24, 2012

(65) Prior Publication Data
US 2012/0307450 A1 Dec. 6, 2012

(30) Foreign Application Priority Data
Jun. 2, 2011 (CN) .......................... 2011 1 0147631

(51) Int. Cl.
*H05K 7/20* (2006.01)
*G06F 1/20* (2006.01)

(52) U.S. Cl.
CPC ....................................... *G06F 1/20* (2013.01)
USPC ...... 361/697; 361/679.48; 361/696; 454/186; 454/341

(58) Field of Classification Search
USPC ............ 361/676–678, 679.46–679.5, 679.54, 361/688–720, 831
See application file for complete search history.

(56) References Cited

U.S. PATENT DOCUMENTS

| 6,084,774 | A | * | 7/2000 | Talbot et al. | 361/704 |
| 6,678,157 | B1 | * | 1/2004 | Bestwick | 361/695 |
| 7,038,913 | B2 | * | 5/2006 | Lee et al. | 361/709 |
| 8,154,871 | B2 | * | 4/2012 | Kuwahara | 361/697 |
| 2004/0196629 | A1 | * | 10/2004 | Broder et al. | 361/695 |
| 2005/0231909 | A1 | * | 10/2005 | Liang | 361/695 |
| 2007/0165374 | A1 | * | 7/2007 | Chen et al. | 361/687 |
| 2010/0002375 | A1 | * | 1/2010 | Yao et al. | 361/679.49 |

* cited by examiner

*Primary Examiner* — Courtney Smith
(74) *Attorney, Agent, or Firm* — Novak Druce Connolly Bove + Quigg LLP

(57) ABSTRACT

The electronic device enclosure includes a case and a cooling assembly. The case includes a top plate, a bottom plate, a side plate and a mounting plate. The top plate is opposite to the bottom plate, and the side plate is substantially perpendicularly connected to the top plate and the bottom plate. The cooling assembly includes a cooler and a fan secured to the cooler. The mounting plate is secured to the top plate and the bottom plate, the fan is secured to the mounting plate and located between the mounting plate and the cooler.

13 Claims, 3 Drawing Sheets

ELECTRONIC DEVICE ENCLOSURE

BACKGROUND

1. Technical Field

The present disclosure relates to electronic device enclosures, and particularly to an electronic device enclosure with a cooling assembly.

2. Description of Related Art

Presently, an electronic device enclosure is capable of installing different kinds of motherboards. Although the electronic device enclosure may often be packaged separately to ship, some components can be packaged together with the electronic device enclosure. Generally, the cooling assembly may be packaged in a box, and the box may be placed in the electronic device enclosure and shipped with the electronic device enclosure. During shipping, the box can easily move inside the electronic device enclosure, and the cooling assembly may be easily crashed and damaged.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
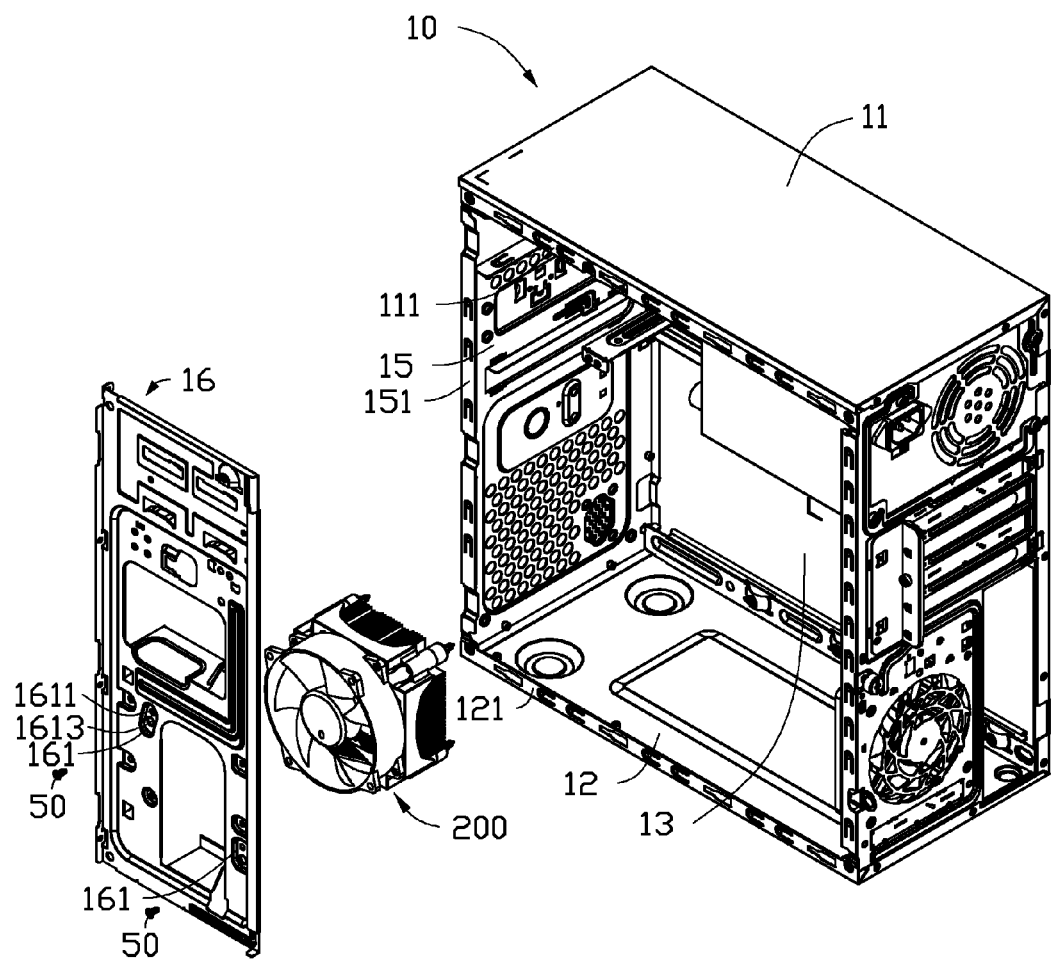
FIG. 1 is an exploded, isometric view of an embodiment of an electronic device enclosure and a cooling assembly.

Referring to FIG. 1, an electronic device enclosure in accordance with an embodiment includes a case 10 and a cooling assembly 200.

The case 10 includes a top plate 11, a bottom plate 12, a rear plate 13 and a side plate 15. In one embodiment, the top plate 11 is substantially parallel to the bottom plate 12 and perpendicular to the side plate 15, and the top plate 11 and the side plate 15 are substantially perpendicular to the rear plate 13. A first flange 111 extends from an edge of the top plate 11. A second flange 121 extends from the bottom plate 12. A third flange 151 extends from the side plate 15. In one embodiment, the first flange 111, the second flange 121 and the third flange 151 are substantially parallel to the rear plate 13.

The case 10 further includes a mounting plate 16. Two locking portions 161 are located on the mounting plate 16. Each of the two locking portions 161 defines a mounting hole 1611 and a locking hole 1613. In one embodiment, a size of the locking hole 1613 is larger than a size of the mounting hole 1611. The mounting hole 1611 is adapted to secure a data storage device, such a hard disk drive (not shown). The locking hole 1613 is adapted to secure the cooling assembly 200.

The mounting plate 16 is secured to the first flange 111, the second flange 121 and the third flange 151.

Figure 2:
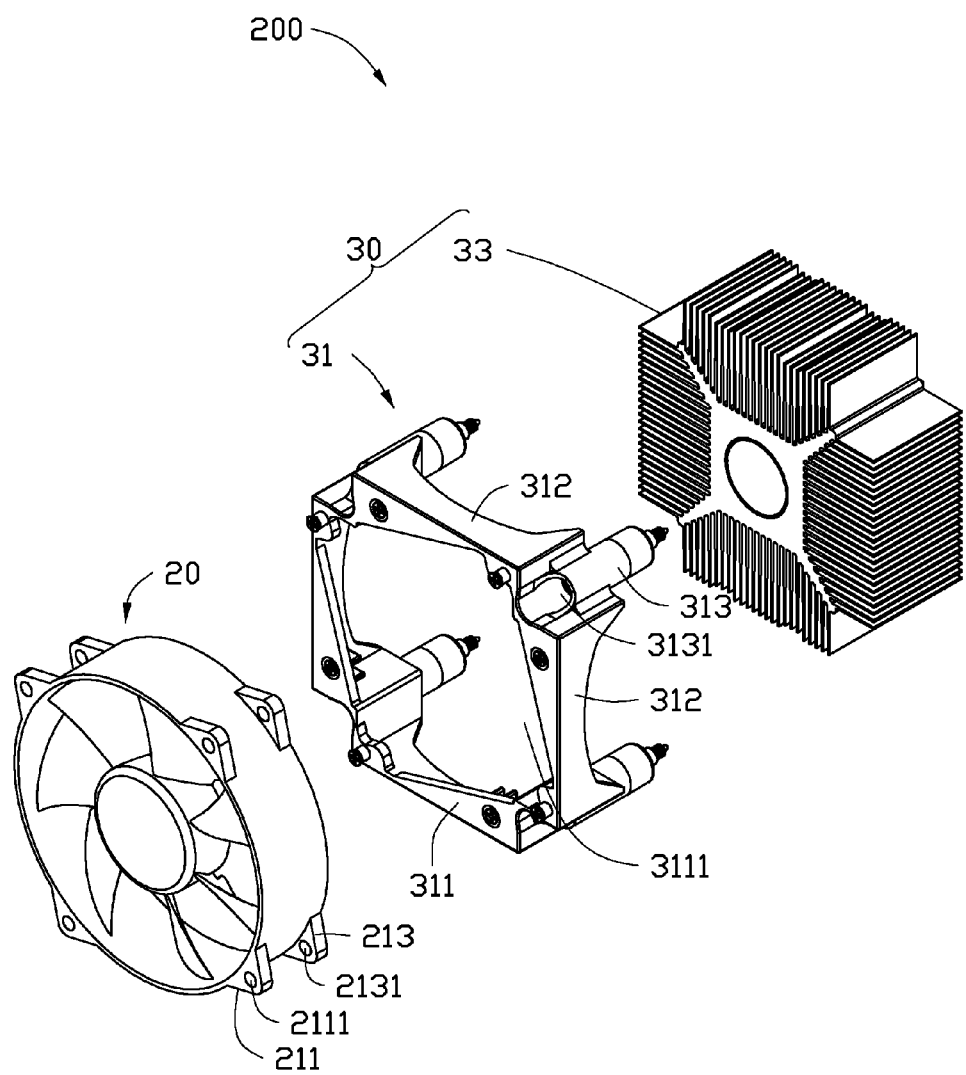
FIG. 2 is an exploded, isometric view of the cooling assembly of FIG. 1.

Referring to FIG. 2, the cooling assembly 200 includes a fan 20 and a cooler 30. A plurality of first mounting portions 211 and a plurality of second mounting portions 213 extend from an outer surface of the fan 20. In one embodiment, the plurality of first mounting portions 211 and the plurality of second mounting portions 213 are block shaped, and the plurality of first mounting portions 211 are substantially parallel to the plurality of second mounting portions 213. Each of the plurality of first mounting portions 211 defines a first positioning hole 2111. Each of the plurality of second mounting portions 213 defines a second positioning hole 2131. A size of the first positioning hole 2111 and the second positioning hole 2131 are substantially equal to the size of the locking hole 1613. The cooler 30 includes a frame 31 and a plurality of fins 33. The frame 31 includes a top wall 311 and a plurality of sidewalls 312. The plurality of sidewalls 312 is substantially perpendicularly connected to the top wall 311. The top wall 311 defines an opening 3111. An installing portion 313 is located between each adjacent two of the plurality of sidewalls 312. The installing portion 313 defines an installing hole 3131 for a locking member (not shown) passing through. The plurality of fins 33 can be secured between the top wall 311 and the plurality of sidewalls 312.

In assembly of the cooling assembly 200, the plurality of fins 33 are secured to the top wall 311 and received in the frame 31. The plurality of first mounting portions 211 or the plurality of second mounting portions 213 are secured to the top wall 311. If the plurality of first mounting portions 211 are secured to the top wall 311, the fan 20 is capable of driving air to flow along a first direction when the fan 20 is at work. If the plurality of second mounting portions 213 are secured to the top wall 311, the fan 20 is capable of driving air to flow along a second direction opposite to the first direction when the fan 20 is at work.

Figure 3:
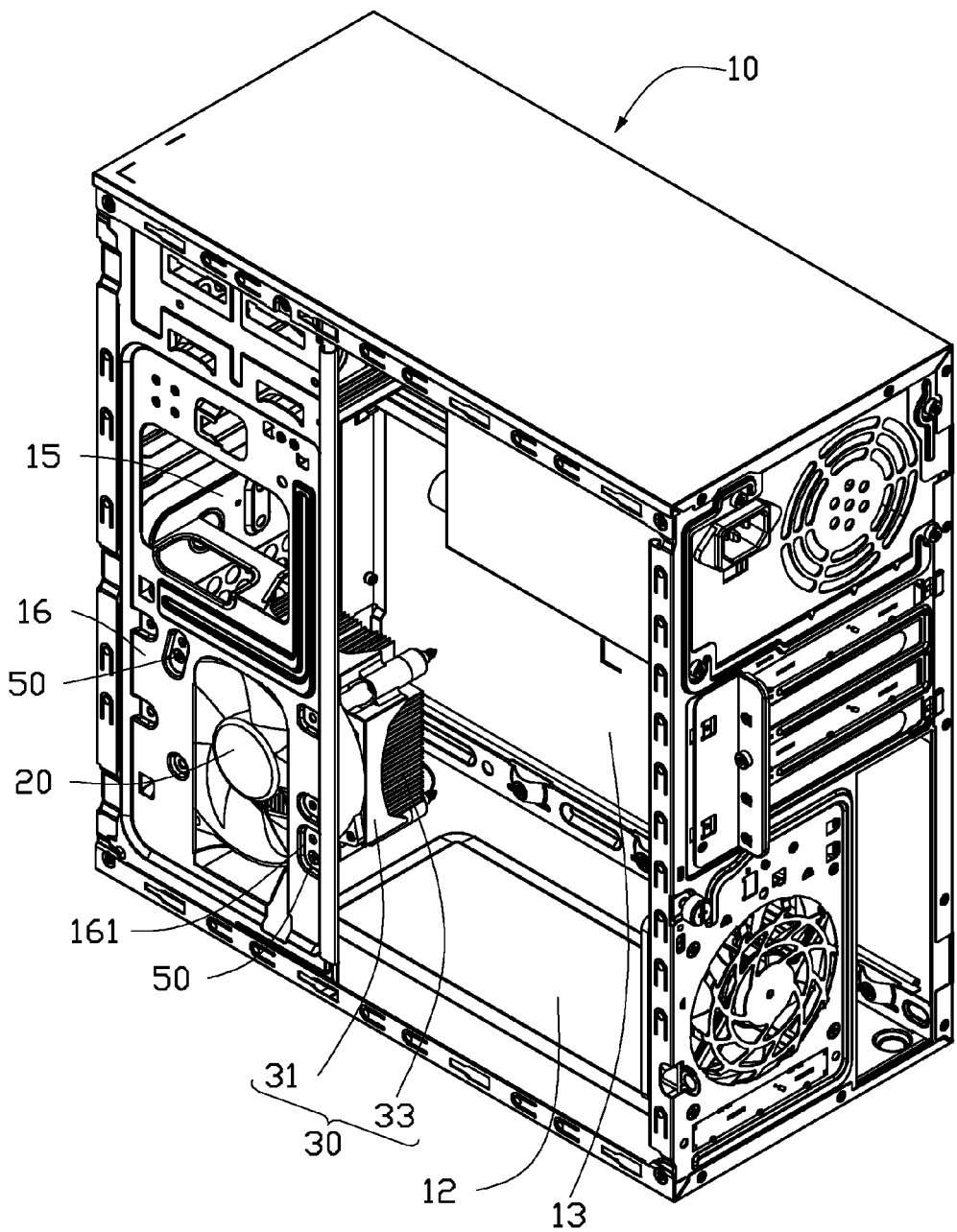
FIG. 3 is an isometric view of the assembled electronic device enclosure and the cooling assembly of FIG. 1.

Referring to FIG. 3, in assembly of the cooling assembly 200 to the case 10, the cooling assembly 200 is placed in the case 10 and located between the mounting plate 16 and the rear plate 13. The plurality of first mounting portions 211 or the plurality of second mounting portions 213 abuts against the two locking portions 161, and the first positioning hole 2111 or the second positioning hole 2131 is aligned with the locking hole 1613. A locking member, such as screw, is inserted into each locking hole 1613 and a corresponding first positioning hole 2111 or the corresponding second positioning hole 2131. The cooling assembly 200 is secured to the case 10. The fan 20 is located between the mounting plate 16 and the cooler 30. The cooler 30 is spaced from the top plate 11, the bottom plate 12, the rear plate 13 and the side plate 15, in order to prevent the cooler 30 from crashing to the rear plate 13.

When the cooling assembly 200 is shipped with the case 10, because the cooling assembly 200 is secured to the mounting plate 16, the cooling assembly 200 can be prevented from moving relative to the case 10. Therefore, damage to the cooling assembly 200 in shipping can be reduced.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
a case comprising a top plate, a bottom plate, a side plate and a mounting plate, the top plate being opposite to the bottom plate, and the side plate connected to the top plate and the bottom plate; and
a cooling assembly comprising a cooler and a fan secured to the cooler;
wherein the mounting plate is secured to the top plate and the bottom plate, the fan is secured to the mounting plate and located between the mounting plate and the cooler; the case further comprises a rear plate, the top plate and the side plate are substantially perpendicular to the rear plate, and the mounting plate is substantially parallel to the rear plate; the cooler is spaced from the top plate, the bottom plate, the rear plate, and the side plate;
wherein the fan comprises a first mounting portion and a second mounting portion, the first mounting portion is secured to the cooler, the second mounting portion is secured to the mounting plate, and the first mounting portion is substantially parallel to the second mounting portion; a locking portion is located on the mounting plate, and the fan is secured to the locking portion; the locking portion defines a locking hole, and the locking hole is configured to secure the fan; and the locking portion further defines a mounting hole, and the mounting hole is configured to secure a data storage device.

2. The electronic device enclosure of claim 1, wherein a size of the locking hole is larger than a size of the mounting hole.

3. The electronic device enclosure of claim 1, wherein the first mounting portion defines a positioning hole, and a size of the positioning hole is substantially equal to a size of the locking hole.

4. The electronic device enclosure of claim 1, wherein the first mounting portion and the second mounting portion are block shaped.

5. The electronic device enclosure of claim 1, wherein the cooler comprises a frame and a plurality of fins, the fan is secured to the frame, and the plurality of fins is received in the frame.

6. An electronic device enclosure comprising:
a case comprising a top plate, a bottom plate, a side plate and a rear plate, the top plate being opposite to the bottom plate, and the side plate substantially perpendicularly connected to the top plate and the bottom plate; and the side plate, the top plate and the bottom plate substantially perpendicularly connected to the rear plate;
a mounting plate secured to the bottom plate and the top plate and substantially parallel to the rear plate; and
a cooling assembly comprising a cooler and a fan secured to the cooler;
wherein the fan is secured to the mounting plate directly and located between the mounting plate and the cooler; and the cooling assembly is spaced from the top plate, the bottom plate, the side plate and the rear plate.

7. The electronic device enclosure of claim 6, wherein the fan comprises a first mounting portion and a second mounting portion, the first mounting portion is secured to the cooler, the second mounting portion is secured to the mounting plate, and the first mounting portion is substantially parallel to the second mounting portion.

8. The electronic device enclosure of claim 7, wherein a locking portion is located on the mounting plate, and the fan is secured to the locking portion; the locking portion defines a locking hole, and the locking hole is configured to secure the fan.

9. The electronic device enclosure of claim 8, wherein the locking portion further defines a mounting hole, and the mounting hole is configured to secure a data storage device.

10. The electronic device enclosure of claim 9, wherein a size of the locking hole is larger than a size of the mounting hole.

11. The electronic device enclosure of claim 8, wherein the first mounting portion defines a positioning hole, and a size of the positioning hole is substantially equal a size of the locking hole.

12. The electronic device enclosure of claim 7, wherein the first mounting portion and the second mounting portion are block shaped.

13. The electronic device enclosure of claim 6, wherein the cooler comprises a frame and a plurality of fins, the fan is secured to the frame, and the plurality of fins is received in the frame.

* * * * *